United States Patent
Elias et al.

(10) Patent No.: US 9,547,508 B2
(45) Date of Patent: Jan. 17, 2017

(54) UNIVERSAL DATABASE DRIVER

(71) Applicant: Red Hat, Inc., Raleigh, NC (US)

(72) Inventors: Filip Elias, Brno (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/708,717

(22) Filed: May 11, 2015

(65) Prior Publication Data

US 2016/0335104 A1    Nov. 17, 2016

(51) Int. Cl.
  *G06F 3/00*    (2006.01)
  *G06F 9/445*    (2006.01)
  *G06F 17/30*    (2006.01)
  *G06F 13/10*    (2006.01)

(52) U.S. Cl.
  CPC ......... *G06F 9/44521* (2013.01); *G06F 13/102* (2013.01); *G06F 17/30887* (2013.01)

(58) Field of Classification Search
  CPC .............................. G06F 9/547; G06F 9/44521
  USPC ........................................... 719/330; 710/321
  See application file for complete search history.

(56) References Cited

U.S. PATENT DOCUMENTS

| | | | |
|---|---|---|---|
| 5,701,461 A * | 12/1997 | Dalal | G06F 17/30457 |
| 6,442,541 B1 | 8/2002 | Clark et al. | |
| 6,502,088 B1 | 12/2002 | Gajda et al. | |
| 6,775,834 B2 * | 8/2004 | Bidarahalli | G06F 19/321 |
| | | | 706/924 |
| 7,024,666 B1 * | 4/2006 | Brown | G06F 8/47 |
| | | | 700/246 |
| 7,269,692 B2 | 9/2007 | Irudayaraj | |
| 7,350,210 B2 | 3/2008 | Mueller et al. | |
| 7,681,077 B1 * | 3/2010 | Eitzmann | G06F 11/3648 |
| | | | 714/20 |
| 8,544,073 B2 | 9/2013 | Silhavy et al. | |
| 8,732,191 B2 | 5/2014 | Somogyi et al. | |
| 2002/0107835 A1 * | 8/2002 | Coram | G06F 17/30457 |
| 2002/0184610 A1 * | 12/2002 | Chong | G06F 8/20 |
| | | | 717/109 |
| 2008/0120304 A1 | 5/2008 | Calio et al. | |
| 2015/0019584 A1 | 1/2015 | Berg et al. | |
| 2015/0220601 A1 * | 8/2015 | Leyba | G06F 17/30498 |
| | | | 707/706 |

OTHER PUBLICATIONS

Mark Baker, GridRM: An Extensible Resource Monitoring System, 2003.*
"Dynamic Loading of JDBC Drivers", kfu.com/~nsayer/Java/dynjdbc.html, Apr. 14, 2015, 2 pages.

(Continued)

*Primary Examiner* — Lechi Truong
(74) *Attorney, Agent, or Firm* — Haynes and Boone, LLP

(57) ABSTRACT

Methods, systems, and computer program products are included to provide a universal database driver, into which one or more driver implementations may be loaded. The universal database driver communicates with one or more databases using the appropriate driver implementation for each database. A driver manager is provided that requests driver implementations corresponding to the databases, and loads the driver implementations into the universal database driver.

20 Claims, 4 Drawing Sheets

(56) References Cited

OTHER PUBLICATIONS

"Generic JDBC Driver Which Handles Two JDBC Driver" htp://stackoverflow.com/questions/19329554/generic-jdbc-driver-which-handles-two-jdbc-driver, Oct. 12, 2013, 2 pages.
Anson Kokkat, "Understand the DB2 UDB JDBC Universal Driver" ibm.com/developerworks/data/library/techarticle/dm-0512kokkat/, Dec. 22, 2005, 11 pages.
Java™ Platform Standard Ed. 8, "Class DriverManager" https://docs.oracle.com/javase/8/docs/api/java/sql/DriverManager.html Apr. 14, 2015, 9 pages.
Scott Robinson, "Choose the Right JDBC Driver for your Database Interface" techrepublic.com/articie/choose-the-right-jdbo-driver-for-your-database-interface/, Apr. 23, 2004, 8 pages.
Terrence Mason et al., "Dynamic Database Integration in a JDBC Driver" ICEIS 2005, Proceedings of the Seventh International Conference on Enterprise Information Systems, Miami, USA, May 25-28, 2005, 8 pages.

\* cited by examiner

UNIVERSAL DATABASE DRIVER

BACKGROUND

A Java Database Connectivity (JDBC) Application Programming Interface (API) defines an interface for an application to interact with a database. For example, a user may use the JDBC API to connect to a database and insert data values into a database, locate data values in the database, delete data values from the database and/or retrieve data values from the database.

There are many different database types. Each database type may have a different communication protocol. Accordingly, a JDBC API that provides an interface for one type of database may not be compatible with another type of database.

Each JDBC API may be implemented in a JDBC driver. A database vendor that provides a database may distribute a JDBC driver to the users of the database in order for the users to access the database. As the number of database types continues to increase, the number of JDBC drivers released by database vendors also continues to increase as well.

For a user, this creates the problem of identifying, accessing and installing the correct JDBC driver for each database that the user would like to access. This problem is compounded as additional versions of databases and JDBC drivers are released. In many instances, a user may not have access privileges to install the required JDBC driver needed to access a database. For example, installing a driver may require system administrator access that the user does not have.

BRIEF SUMMARY

According to an example, a computer-implemented method includes specifying, at an application, a uniform resource locator (URL) and a database request, wherein the URL identifies a location of a database, wherein the URL is associated with a property that identifies a driver implementation, wherein the database request corresponds to the database. The method further includes communicating the URL and the database request to a universal database driver. The method further includes establishing a first connection to a driver implementation module associated with the database. The method further includes receiving, via the first connection, a driver implementation from the driver implementation module. The method further includes loading the driver implementation into the universal database driver to form a first database driver. The method further includes providing the first database driver as an interface to communicate the database request to the database.

According to an example, a non-transitory computer-readable medium includes computer-readable instructions, the computer-readable instructions executable by a processor to cause the processor to: receive a uniform resource locator (URL) and a request corresponding to the URL, wherein the URL is associated with a database and a driver implementation. The instructions further executable to request the driver implementation from a driver implementation module, the driver implementation module being associated with the database. The instructions further executable to receive the driver implementation from the driver implementation module. The instructions further executable to create an instance of a driver, the instance of the driver having methods that correspond to methods of the driver implementation. The instructions further executable to map a method of the instance of the driver to a method of a shim class. The instructions further executable to call the method of the shim class to at least one of: (i) connect to the database, (ii) send the request to the database, and (iii) receive a result corresponding to the request.

According to an example, a system includes a processor and a memory. The system further includes a universal database driver, the universal database driver executable by the processor to communicate a database request to a database. The system further includes a driver manager communicatively coupled to the universal database driver, the driver manager to request, via a network, a driver implementation from a driver implementation module that is an extension of the database, the driver manager further to load the driver implementation into the universal database driver, wherein at least one method corresponding to the driver implementation is mapped to at least one method corresponding to the universal database driver. The system further includes a cache communicatively coupled to the universal database driver and the driver manager, the cache to store the driver implementation.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
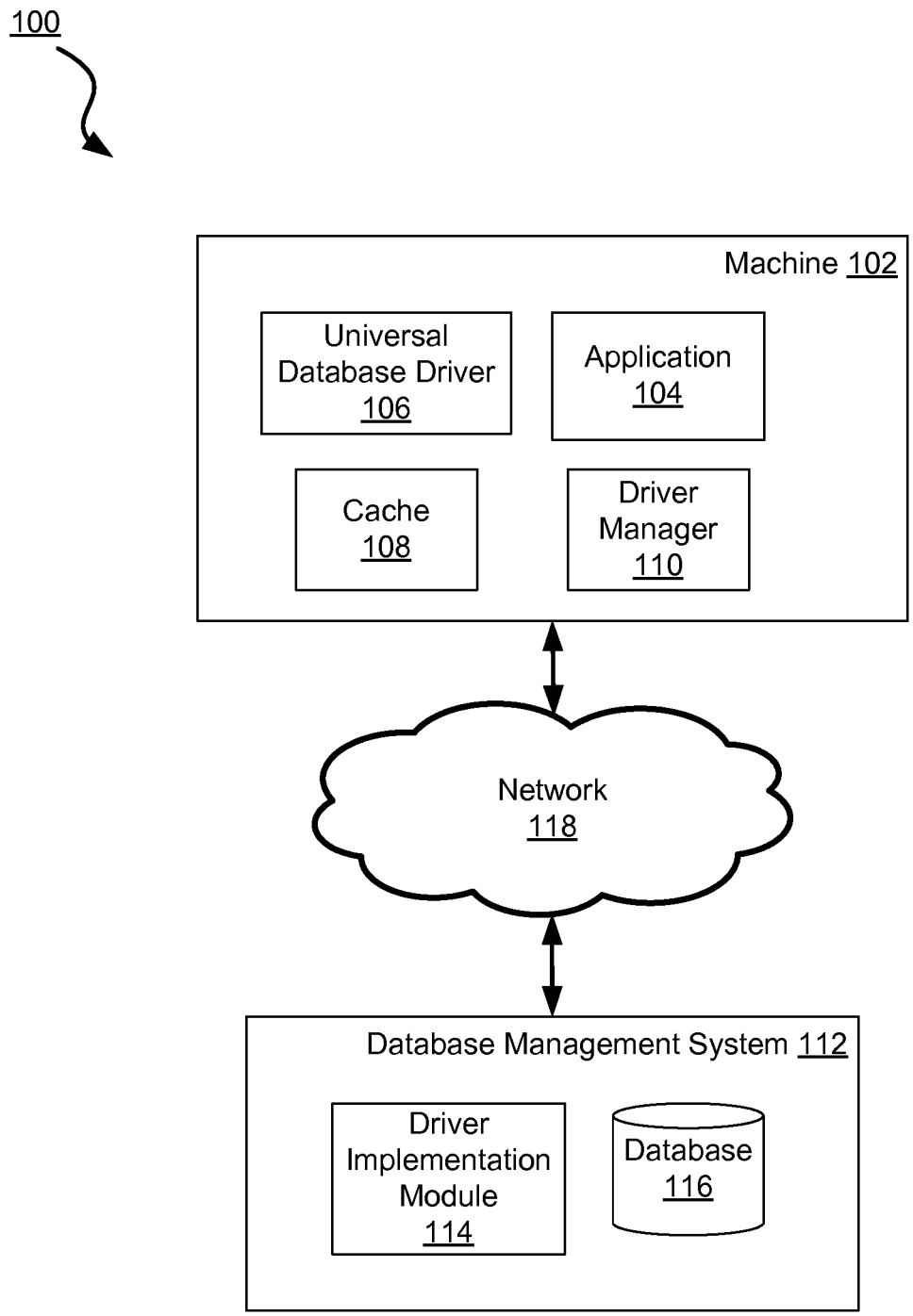
FIG. 1 is a block diagram illustrating a universal database driver system architecture, in accordance with various examples of the present disclosure.

FIG. 1 illustrates a universal database driver system architecture 100, in which examples of the present disclosure can be implemented.

System architecture 100 includes a machine 102, such as a computing device that includes hardware, software or a combination of both hardware and software. The machine 102 includes an application 104, a universal database driver 106, a cache 108 and a driver manager 110. The application 104, universal database driver 106, cache 108 and driver manager 110 may be structured as software components, hardware components or a combination of both.

In some examples, the application 104 is a JAVA application. In the present example, the application 104 is structured to specify a uniform resource locator (URL) that corresponds a database 116. The database 116 is associated with data corresponding to the application 104. The URL includes properties, such as a string that identifies the database driver required to access the database 116, and any additional properties used to access the database 116.

For example, the URL may be specified in a connection string for the database 116 along with the properties for accessing the database 116, such as:
String url="jdbc:postgresql://address/test?user=user&password=pw&databasedriver=java.postgresql.Driver";
where address is the location of a machine hosting the database 116, test is the specific database 116 to access on the machine, user is a username used to access the database 116, pw is the password corresponding to the username, and java.postgresql.Driver is the identifier of the driver implementation that is required to access the database 116. In this example, the driver implementation is a JDBC driver. Accordingly, the driver implementation may be structured as one or more classes that are stored in a JAR file.

In another example, the properties may be associated with the URL, but not stored in the URL itself. For example, the URL and properties may be specified as follows:
String url="jdbc:sql://database/databaseA";
Properties parameter=new Properties( );
Parameter.setProperty("databasedriver","java.sql.Driver"). In this example, the driver implementation "java.sql.Driver" is specified as a property that is set in a parameter variable that is separate from the URL string. The properties are associated with the URL string, even when not part of the string itself, such that a communication of the URL string may also include a communication of the properties.

In other examples, additional properties may be specified corresponding to the driver implementation. For example, different driver implementations may be specified based on the specified properties associated with the URL. For example, a driver implementation of a particular driver may provide encryption, while another driver implementation of that driver does not provide encryption. Accordingly, based on which property is specified, the application 104 may control whether to use the driver implementation that provides encryption or the driver implementation that does not provide encryption. In another example, driver implementations may be customized for other purposes besides encryption. For example, driver implementations may be customized for the purposes of debugging or providing special SQL construct support.

In other examples, the application 104 represents an application server that communicates with a client application via a network. The client application may be, for example, a browser-based application on a remote client machine that accesses the application 104 remotely.

In the present example, the universal database driver 106 is structured to receive the URL and one or more database requests that are sent from the application 104. In some examples, the universal database driver 106 is a universal JDBC database driver that is configured to provide a JDBC API interface for the application 104 to access one or more databases, such as database 116, on behalf of the application 104. A database driver is referred to as a "universal database driver" if it is capable of being used to interface with databases that require different drivers. For example, a database driver is a "universal database driver" if it is capable of interfacing with a first database that requires a first database driver and a second database that requires a second database driver, where the first database driver and the second database driver are different database drivers. In some examples, the universal database driver is a template, into which a database driver implementation may be loaded to form a database driver that is capable of interfacing with a particular database or database type. The template may be, for example, a shim class, as described below in further detail. In some examples, a universal driver includes a template, which when mapped to and/or loaded with particular database driver implementations, is capable of interfacing to databases corresponding to the database driver implementations. For example, a universal database driver may be loaded with a first database driver implementation in order to interface with a first database, and be loaded with a second database driver implementation in order to interface with a second database.

A database request may be, for example, a statement that is executed to search, insert data into, delete, and/or retrieve data values from one or more databases. In some examples, the database request is an SQL statement, such as a SELECT statement, a DELETE statement, an INSERT statement, and so forth. In other examples, the database request is a non-SQL database request. In the present example, the universal database driver 106 is structured with a driver implementation that is "loaded" into the universal database driver 106 by the driver manager 110. The driver implementation provides a compatibility layer such that the universal database driver 106 is configured to communicate between the application 104 and one or more databases.

In the present example, the universal database driver 106 is structured to accept as input one or more driver implementations from the driver manager 110. In the present example, the universal database driver 106 is structured with a shim class. In some examples, shim class is a class that inherits data and behavior of a base class. In other examples, a shim class is a class that provides a compatibility layer for accessing data and/or methods of another class. In yet another example, a shim class is a template class that passes on its calls to another class. A shim class may be used, for example, to provide access to data and/or methods of one or more classes that are included in one or more database implementations. In some examples, a "universal database driver" is a program that includes a shim class that is capable of accessing data and/or methods of one or more driver implementations in order to act as an interface with one or more databases.

The universal database driver 106 is structured to identify classes of an input driver implementation and to map those classes to the shim class. In particular, methods of the input driver implementation may be mapped to methods of the shim class. Accordingly, by calling methods of the shim class, methods of the driver implementation may be called. The shim class therefore provides a layer that translates between the application 104 and the driver implementation input by the driver manager 110. Input of a driver implementation into the universal database driver 106 and mapping of the driver implementation is referred to as "loading" the driver implementation into the universal database driver 106.

In the present example, the cache 108 is structured as a relational database that stores records. Records may be structured as key/value pairs. In the present example, each key corresponds to a URL. The value associated with each key corresponds to the driver implementation that is associated with the URL. In some examples, the value is a pointer to the driver implementation. In other examples, the value is an identifier corresponding to the driver implementation.

In the present example, the driver manager 110 is a component that manages driver implementations, such as JDBC database drivers. In some examples, the driver manager 110 is a JAVA component. The driver manager 110 is structured to send the URL and its associated properties to a driver implementation module 114, to retrieve a driver implementation that corresponds to the URL and its specified properties. For example, if the driver implementation is stored in a JAR file, the JAR file may be downloaded from the driver implementation module 214 to the driver manager 208. The driver manager 110 is structured to input the received driver implementation into the universal database driver 106 and the cache 108. Inputting the received driver implementation into the cache allows future use of the driver implementation without having to request the driver implementation from the driver implementation module 114. Providing local access to driver implementations allows driver implementations to be accessed more efficiently.

System architecture 100 includes a database management system 112. In some examples, the database management system 112 is deployed on a machine that is separate from the machine 102 and accessible to the machine 102 components via a network 118. For example, the database management system 112 may be deployed on a remote database server. In other examples, the database management system 112 may be stored locally on the machine 102. In the present example, the database management system 112 is structured to receive database requests, URLs, and URL properties from the components of the machine 102.

The database management system 112 includes a driver implementation module 114 that is structured to respond to driver implementation requests by sending driver implementations to the driver manager 110. In the present example, the driver implementation module 114 is structured as an extension of the database 116, such that a first access of the database 116 results in retrieval of the appropriate driver implementation for accessing the database 116. In the present example, the driver implementation module includes a data store that stores driver implementations associated with the database 116. Driver implementation module 114 is structured to match driver implementation requests from the driver manager 110 with stored driver implementations and to return the matching driver implementations to the driver manager 110.

The database management system 112 includes a database 116 that is structured as a data store. The database management system 112 is structured to access the data store to store, query, delete, sort and retrieve data values on behalf of the universal database driver 106 and the application 104.

The database 116 may include any type of database, such as one or more flat files, SQL databases, XML databases, and variants and combinations thereof. For example, a database may be a relational database or a non-relational database.

Figure 2:
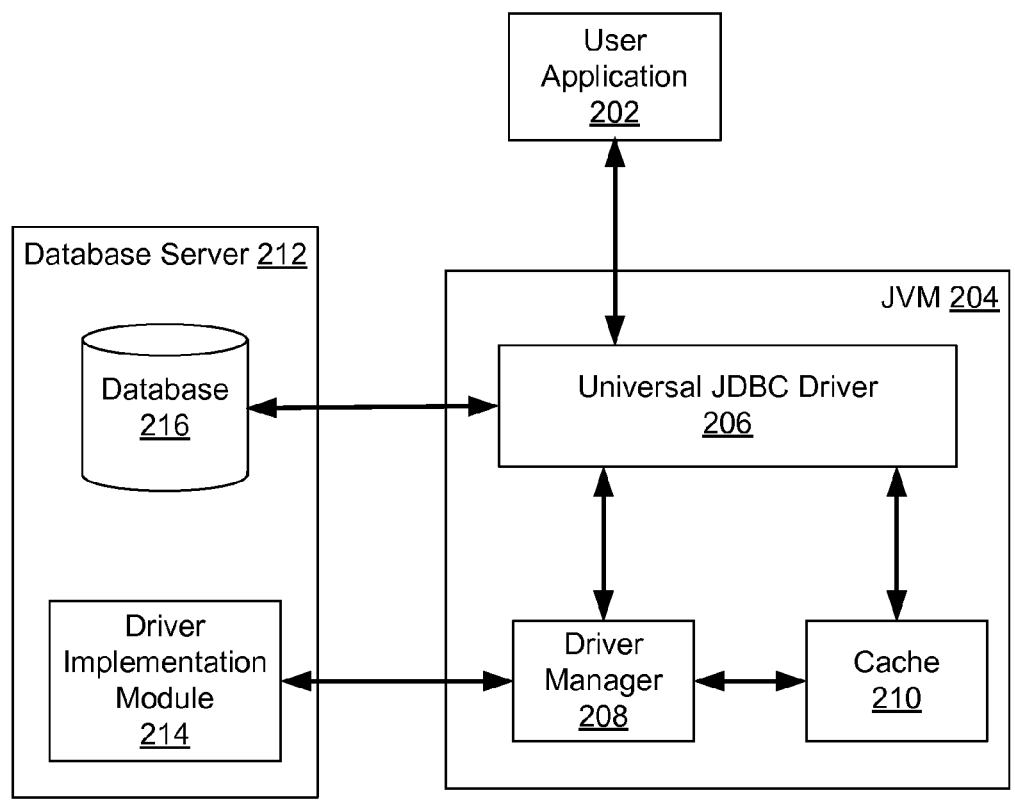
FIG. 2 is a block diagram illustrating a communicative coupling of modules in a universal database driver architecture, in accordance with various examples of the present disclosure.

FIG. 2 is a block diagram illustrating a communicative coupling of modules in a universal database driver architecture 200, according to some examples of the present disclosure.

In the present example, the user application 202 is structured as separate from a JAVA virtual machine (JVM) 204. For example, the user application 202 may be a browser application or other application running on a remote user machine. The user application 202 is structured to send a URL (including URL properties) and a database request to the universal JDBC driver 206 that is running on the JVM 204. The user application 202 is communicatively coupled to the universal JDBC driver, such as via a network and an application server.

In the present example, a universal JDBC driver 206 is structured as a JDBC driver for a plurality of different and non-compatible database types. For example, the universal JDBC driver 206 is structured to interact with different JDBC driver implementations, and call methods of those JDBC driver implementations in order to act as a "universal" JDBC driver for accessing the database 216 as well as other databases (not shown).

The universal JDBC driver is communicatively coupled to a cache 202, a driver manager 208, and a database 216. The cache 202 is structured to store driver implementations. The driver manager is structured to receive driver requests from the universal JDBC driver 206, to request the driver implementations corresponding to the driver requests from a driver implementation module 214, and to load driver implementations received from the driver implementation module 214 into the universal JDBC driver 206 and cache 210. Accordingly, the driver manager 208 is communicatively coupled to the driver implementation module 214 and the cache 210.

In the present example, the database 216 and the driver implementation module 214 are stored on a database server 212. The database server 212 may be, for example, a machine that is remote from a machine hosting the JVM 204 and is accessible over a network. While one database server 212 is shown here, there may also be a plurality of database servers that are accessible to the universal JDBC driver 206 and the driver manager.

Figure 3:
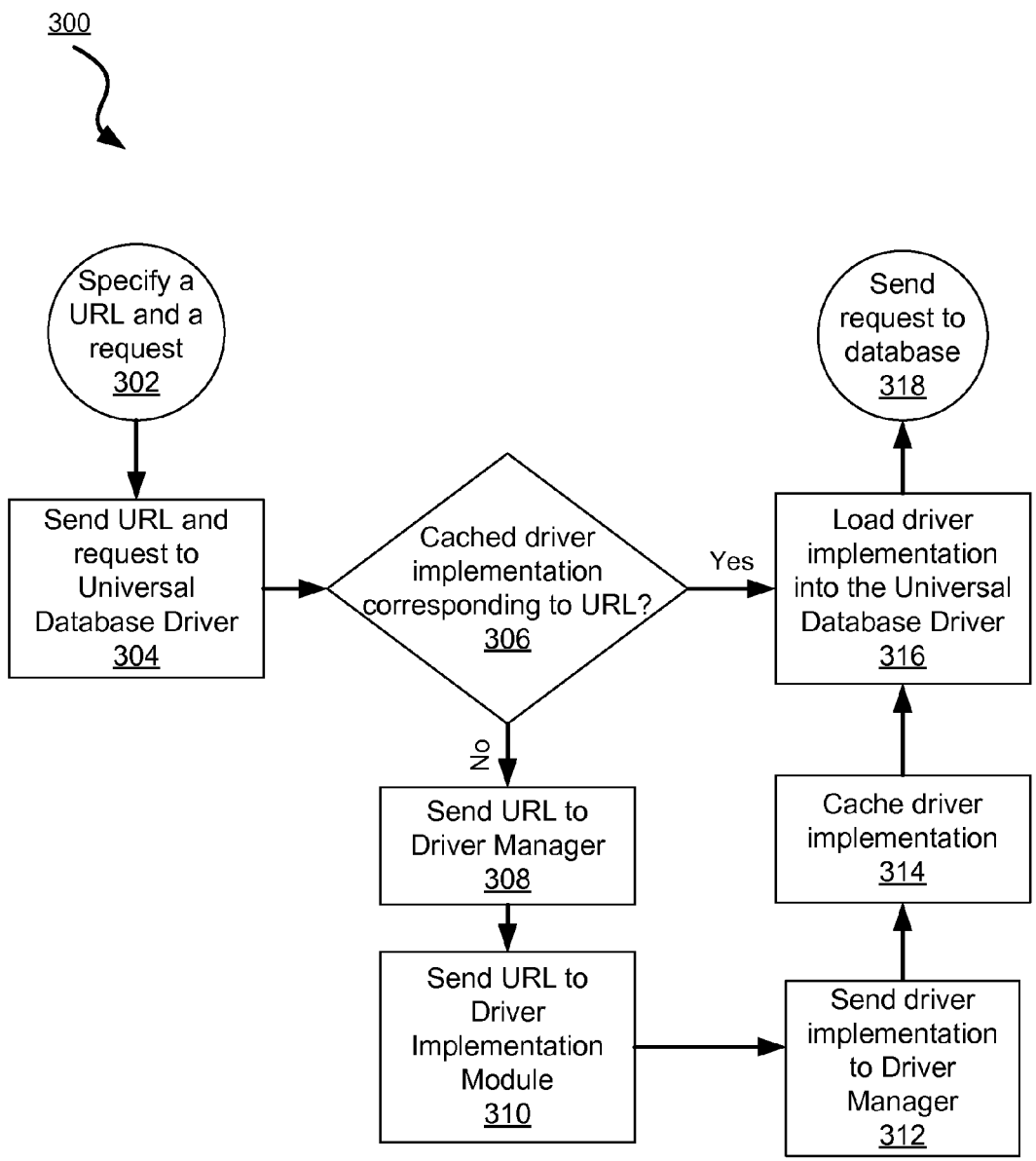
FIG. 3 is a flow diagram illustrating a method for loading a driver implementation associated with a database request, in accordance with various examples of the present disclosure.

FIG. 3 is a flow diagram illustrating a method for loading a driver implementation associated with a database request, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 302, an application specifies a URL, including properties corresponding to the URL, and a database request. The URL includes a database address and a database identifier. In the present example, the URL includes the properties in the URL, such as in a string that includes delimiters that separate the properties. In other examples, the properties are stored separately from the URL, such as in one or more property variables that are associated with and communicated with the URL. Properties include, for example, a driver implementation that is associated with the database identified in the URL. In the present example, the request is a database statement that may be executed to insert, search, delete or perform other action on data values in the database.

At block 304, the application sends the URL (including the properties of the URL) and the request to a universal database driver. The universal database driver receives the URL and the request.

At block 306, the universal database driver requests a driver implementation corresponding to the URL from the cache. This may be performed by inputting the URL as a search key, and returning any values that correspond to that key. If the driver implementation is located in the cache, the process continues at block 316.

At block 308, if the cache does not identify any driver implementations matching the URL, then the universal database driver is able to determine that the driver implementation is not stored in the cache. Accordingly, the universal database driver proceeds by sending the URL to a driver manager.

At block 310, the driver manager identifies the address of the database, such as by parsing the URL. For example, the address of the database may be a first portion of a URL string, the identity of the database may be a second portion of the URL string, and properties of the database may be a third portion of the URL string. The first portion and the second portion may be separated, for example, by a "I" delimiter. The second and the third portions may be separated, for example, by a "?" delimiter, with each property in the URL being separated by a "&" delimiter. In other examples, the properties are stored separately from, but in association with, the URL string.

The driver manager sends the URL to the specified database address. The address may include a unique identifier for the location of the database and a port number. A driver implementation module corresponding to the address receives the URL. In some examples the driver implementation module monitors the port at the address for incoming requests. In other examples, a database management system or other module monitors incoming requests and forwards driver implementation requests to the driver implementation module.

At block 312, the driver implementation module parses the URL and properties to identify the particular database implementation to return responsive to the request from the driver manager. For example, the driver implementation may be one or more classes that are stored in a JAR file. The driver implementation module may perform a matching of a driver implementation specified in a property of the URL with one or more JAR files in order to identify the JAR file that stores the driver implementation. The identified JAR file, in this example, would be communicated to the driver manager responsive to the request.

At block 314, the driver manager receives the driver implementation from the driver implementation module and caches the driver implementation in a cache. In the present example, a record is created in the cache corresponding to the driver implementation. The URL is specified as the key and the driver implementation (or an identifier associated with the driver implementation) is specified as the value corresponding to the key. The value may be a pointer or other identifier for the driver implementation, such that the driver implementation may be retrieved from the cache when the cache receives a query containing the URL (or some portion thereof).

At block 316, the driver manager loads the driver implementation into the universal database driver. In the present example, the loading of the driver implementation into the universal database driver is performed by the driver manager parsing the URL to identify a file name corresponding to the driver implementation. The driver manager inputs the file name to the universal database driver. The universal database driver scans the file to identify one or more classes in the file specified by the file name. The universal database driver creates a driver instance of a driver class, where the driver class corresponds to the one or more classes in the file. The driver instance is input into the shim class and the shim methods are mapped to the methods of the driver instance, thereby mapping the shim class to the driver implementation. After performing the mapping, the universal database driver registers the shim class with the driver manager.

Accordingly, by calling methods of the shim class, methods of the driver implementation are executed. This process may be repeated each time a driver implementation that is loaded into the shim class, such that the shim class is mapped to a different driver implementation each time the process is performed.

At block 318, the universal database driver calls a method of the shim class to connect to the database. Because the connection method of the shim class is mapped to a connection method of the driver implementation, the connection method specified by the driver implementation is executed to connect to the database. After connecting, the universal database driver sends the request to the database. In the present example, the sending of the request is also performed by calling a method of the shim class that is mapped to the driver implementation. The driver implementation may include, for example, connection methods, request sending methods, and methods for receiving results of a request. Accordingly, connections to the database, requests and results may all be modified as specified by the driver implementation.

Figure 4:
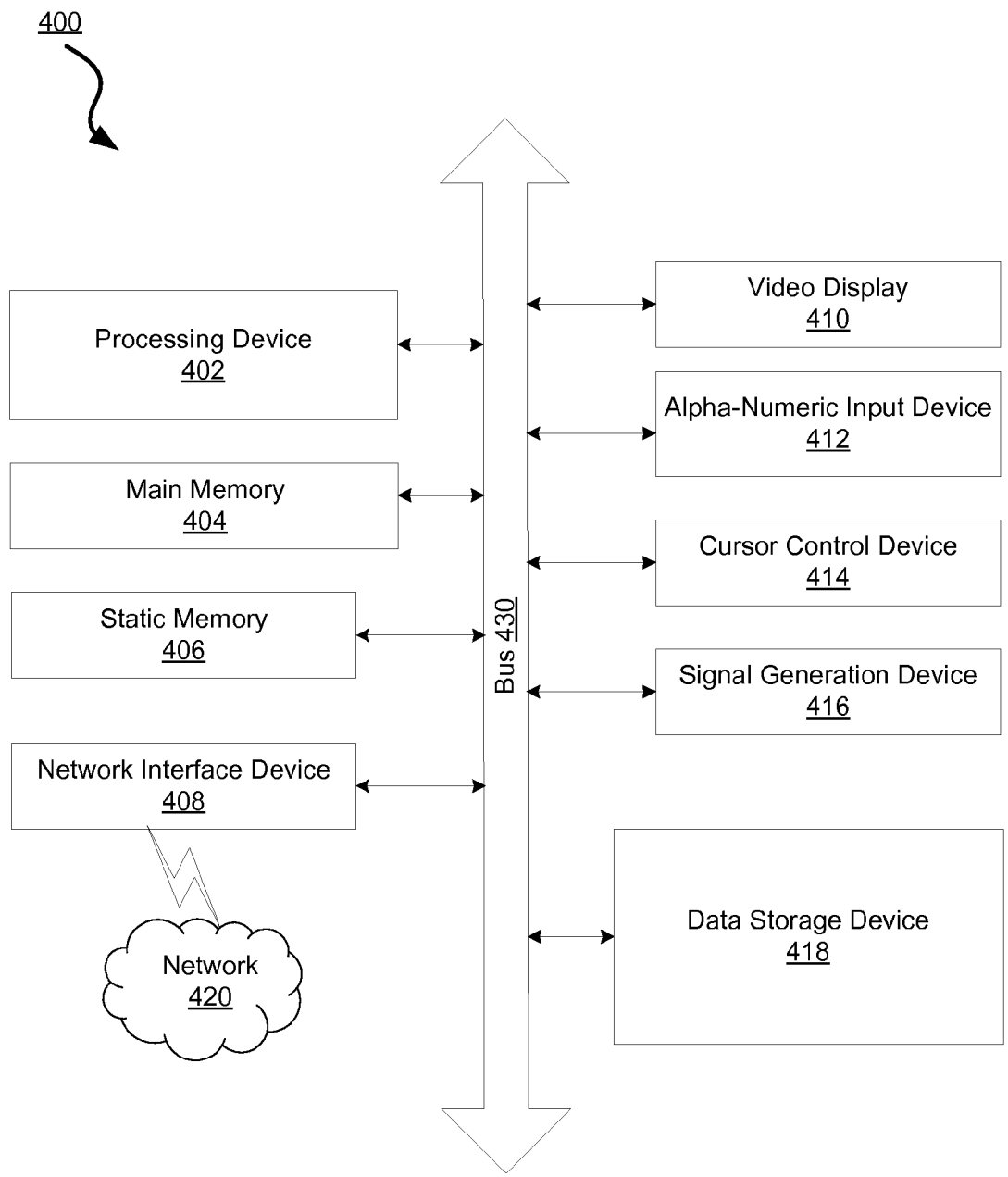
FIG. 4 is a block diagram illustrating a computer system that may perform one or more of the operations described herein.

FIG. 4 illustrates a diagram of a machine in the form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method comprising:
specifying, at an application, a uniform resource locator (URL) and a database request, wherein the URL identifies a location of a database, wherein the URL is associated with a property that identifies a driver implementation, and wherein the database request corresponds to the database;
communicating the URL and the database request to a universal database driver;
establishing a first connection to a driver implementation module associated with the database;
receiving, via the first connection, the driver implementation from the driver implementation module;
loading the driver implementation into the universal database driver to form a first database driver;
providing the first database driver as an interface to communicate the database request to the database;
caching the driver implementation in a cache;
receiving, at the universal database driver, a second database request, the second database request associated with the driver implementation;
requesting, by the universal database driver, the driver implementation from the cache;
determining that the driver implementation is included in the cache; and
loading the driver implementation from the cache into the universal database driver to form the first database driver.

2. The method of claim 1, wherein the cache includes a record that includes a key and a value associated with the key, wherein the key corresponds to the URL, and wherein the value corresponds to the driver implementation.

3. The method of claim 1, wherein the URL and the property are included in a string.

4. The method of claim 3, wherein a first portion of the string identifies the location of the database, wherein a second portion of the string identifies the driver implementation, and wherein the first portion and the second portion are separated by a delimiter.

5. The method of claim 1, wherein providing the first database driver as an interface to communicate the database request to the database comprises:

communicating the database request from the first database driver to the database; and receiving, at the first database driver, a response to the database request from the database.

6. The method of claim 1, wherein the universal database driver is a JDBC driver, and wherein the driver implementation is stored in a JAR file.

7. A method comprising:
specifying, at an application, a uniform resource locator (URL) and a database request, wherein the URL identifies a location of a database, wherein the URL is associated with a property that identifies a driver implementation, and wherein the database request corresponds to the database;
communicating the URL and the database request to a universal database driver;
establishing a first connection to a driver implementation module associated with the database;
receiving, via the first connection, the driver implementation from the driver implementation module;
loading the driver implementation into the universal database driver to form a first database driver, wherein loading the driver implementation into the universal database driver comprises:
inputting a file name corresponding to a file that stores the driver implementation;
identifying a class corresponding to the file;
creating an instance of a driver, the instance corresponding to the class; and
mapping a method of the instance to a method of a shim class; and
providing the first database driver as an interface to communicate the database request to the database.

8. The method of claim 7, wherein the method of the instance is called by calling the method of the shim class.

9. A non-transitory computer-readable medium comprising computer-readable instructions executable by one or more processors to cause the one or more processors to:
receive a uniform resource locator (URL) and a request corresponding to the URL, wherein the URL is associated with a database and a driver implementation;
request the driver implementation from a driver implementation module, the driver implementation module being associated with the database;
receive the driver implementation from the driver implementation module;
create an instance of a driver, the instance of the driver having methods that correspond to methods of the driver implementation;
map a method of the instance of the driver to a method of a shim class;
call the method of the shim class to at least one of: (i) connect to the database, (ii) send the request to the database, or (iii) receive a result corresponding to the request;
cache the driver implementation in a cache;
receive a second request, the second request corresponding to the driver implementation;
request the driver implementation from the cache; and
map a method corresponding to the driver implementation to the shim class.

10. The non-transitory computer-readable medium of claim 9, wherein the cache includes a record that includes a key and a value associated with the key, wherein the key corresponds to the URL, and wherein the value corresponds to the driver implementation.

11. The non-transitory computer-readable medium of claim 9, wherein mapping the instance of the driver to the shim class further comprises:
inputting a file name corresponding to a file that stores the driver implementation;
identifying a class corresponding to the file; and
creating the instance of the driver, the instance of the driver corresponding to the class.

12. A non-transitory computer-readable medium comprising computer-readable instructions executable by one or more processors to cause the one or more processors to:
receive a uniform resource locator (URL) and a request corresponding to the URL,
wherein the URL is associated with a database and a driver implementation,
wherein the URL and the driver implementation are included in a string,
wherein a first portion of the string identifies a location of the database,
wherein a second portion of the string identifies the database,
wherein a third portion of the string identifies the driver implementation,
wherein the first portion and the second portion are separated by a first delimiter,
wherein the second portion and the third portion are separated by a second delimiter, and
wherein the first delimiter is different than the second delimiter;
request the driver implementation from a driver implementation module, the driver implementation module being associated with the database;
receive the driver implementation from the driver implementation module;
create an instance of a driver, the instance of the driver having methods that correspond to methods of the driver implementation;
map a method of the instance of the driver to a method of a shim class; and
call the method of the shim class to at least one of: (i) connect to the database, (ii) send the request to the database, or (iii) receive a result corresponding to the request.

13. A system for loading drivers from a database server, the system comprising:
one or more processors and at least one memory;
a universal database driver, the universal database driver executable by the processor to communicate a database request to a database;
a driver manager communicatively coupled to the universal database driver,
the driver manager to request, via a network, a driver implementation from a driver implementation module that is an extension of the database,
the driver manager further to load the driver implementation into the universal database driver, the load of the driver implementation into the universal database driver comprising:
inputting a file name corresponding to a file that stores the driver implementation;
identifying a class corresponding to the file;
creating an instance of a driver, the instance corresponding to the class; and
mapping a method of the instance of the driver to a method of a shim class; and a cache communicatively coupled to the universal database driver and the driver manager, the cache to store the driver implementation.

14. The system of claim 13, wherein the cache includes a record that includes a key and a value associated with the key, wherein the key corresponds to a URL, and wherein the value corresponds to the driver implementation.

15. The system of claim 13, wherein the universal database driver communicates a URL to the driver manager, wherein the URL identifies a location of the database, wherein the URL is associated with a property that identifies the driver implementation, and wherein the database request corresponds to the database.

16. The system of claim 15, wherein the URL and the property are included in a string.

17. The system of claim 16, wherein a first portion of the string identifies the location of the database, wherein a second portion of the string identifies the database, and wherein a third portion of the string includes the property.

18. The system of claim 17, wherein the first portion and the second portion are separated by a first delimiter, wherein the second portion and the third portion are separated by a second delimiter, and wherein the first delimiter is different than the second delimiter.

19. The system of claim 13, wherein a connection is established between the universal database driver and the database, wherein the universal database driver communicates the database request to the database; and wherein the universal database driver receives, from the database, a result corresponding to the database request.

20. The system of claim 13, the driver manager further to load a second driver implementation into the universal database driver, wherein the universal database driver calls a method corresponding to the second driver implementation in order to connect to a second database, and wherein the second database is different than the database.

* * * * *